US010367317B1

(12) United States Patent
Rahner et al.

(10) Patent No.: US 10,367,317 B1
(45) Date of Patent: Jul. 30, 2019

(54) PORTABLE ELECTRIC POWER HUB WITH AC POWER RECEPTACLES AND USB CHARGING PORTS

(71) Applicant: Premier Manufacturing Group, Inc., Shelton, CT (US)

(72) Inventors: Kelly Rahner, Mohegan Lake, NY (US); Michael O'Keefe, Wethersfield, CT (US); Bernard Bensussan, Stratford, CT (US)

(73) Assignee: Premier Manufacturing Group, Inc., Shelton, CT (US)

( * ) Notice: Subject to any disclaimer, the term of this patent is extended or adjusted under 35 U.S.C. 154(b) by 0 days.

(21) Appl. No.: 15/680,098

(22) Filed: Aug. 17, 2017

Related U.S. Application Data

(60) Provisional application No. 62/518,541, filed on Jun. 12, 2017.

(51) Int. Cl.
*H02J 7/00* (2006.01)
*H01R 27/02* (2006.01)
(Continued)

(52) U.S. Cl.
CPC ........... *H01R 27/02* (2013.01); *H01R 13/506* (2013.01); *H01R 25/006* (2013.01);
(Continued)

(58) Field of Classification Search
CPC .... H01R 25/006; H01R 13/506; H01R 27/02; H01R 31/06; H02J 2007/0062; H04N 21/4363
See application file for complete search history.

(56) References Cited

U.S. PATENT DOCUMENTS

| 2,934,590 | A | * | 4/1960 | Thompson | ............. | H02B 1/048 |
| | | | | | | 439/535 |
| 3,953,933 | A | * | 5/1976 | Goldstein | ................ | H02G 3/12 |
| | | | | | | 174/66 |

(Continued)

FOREIGN PATENT DOCUMENTS

CN 201556767 U * 8/2010

*Primary Examiner* — Briggitte R. Hammond
(74) *Attorney, Agent, or Firm* — Raymond A. Nuzzo

(57) ABSTRACT

A portable electric power hub comprises a housing that includes a base section having a perimeter that is defined by a plurality of straight edges that are joined by a first plurality of rounded corners. The portable electric power hub further includes an intermediate section that includes a plurality of sides that are joined together by a second plurality of rounded corners. Each side of the intermediate section is adjacent to and aligned with a corresponding one of the plurality of straight edges of the base section and each of the second plurality of rounded corners is adjacent to and aligned with a corresponding one of the first plurality of rounded corners. The portable electric power hub further includes an upper section including a plurality of angulated sides joined by a third plurality of rounded corners. Each angulated side is adjacent to and angulated with respect to a corresponding one of the plurality of sides of the intermediate section and each of the third plurality or rounded corners is adjacent to and aligned with a corresponding one of the second plurality of rounded corners. The portable electric power hub further includes at least one electric power receptacle positioned on the housing.

5 Claims, 11 Drawing Sheets

(51) Int. Cl.
*H01R 13/506* (2006.01)
*H01R 25/00* (2006.01)

(52) U.S. Cl.
CPC ........... *H02J 7/0042* (2013.01); *H02J 7/0052* (2013.01); *H02J 2007/0062* (2013.01)

(56) References Cited

U.S. PATENT DOCUMENTS

| | | | | |
|---|---|---|---|---|
| 4,733,330 A * | 3/1988 | Tanaka | ................ | H02G 3/121 174/58 |
| 5,195,288 A * | 3/1993 | Penczak | ................ | H02G 3/185 174/490 |
| 6,283,787 B1 * | 9/2001 | Chou | ................ | H01R 13/465 439/488 |
| 6,379,182 B1 * | 4/2002 | Byrne | ................ | H01R 13/73 439/574 |
| D469,405 S * | 1/2003 | Nieto | ................ | D13/139.6 |
| 6,717,053 B2 * | 4/2004 | Rupert | ................ | H02G 3/14 439/535 |
| 6,885,796 B2 * | 4/2005 | Lubkert | ................ | G06F 1/266 312/223.3 |
| 6,940,015 B2 * | 9/2005 | Fang | ................ | H01R 13/465 174/50 |
| 6,971,911 B2 * | 12/2005 | Ramsey | ................ | A47B 21/06 439/535 |
| 7,053,296 B2 * | 5/2006 | Drane | ................ | H02G 3/0493 174/483 |
| 7,179,996 B1 * | 2/2007 | Britt | ................ | H01R 13/447 174/66 |
| 7,611,364 B2 * | 11/2009 | Kidman | ................ | H01R 13/447 174/66 |
| 7,736,178 B2 * | 6/2010 | Byrne | ................ | G06F 1/266 439/527 |
| 7,806,723 B2 * | 10/2010 | Chong | ................ | H02G 3/22 439/571 |
| 7,989,738 B2 * | 8/2011 | Byrne | ................ | A47J 36/2461 219/452.11 |
| 8,295,036 B2 * | 10/2012 | Byrne | ................ | H01R 25/003 174/57 |
| 8,592,681 B2 * | 11/2013 | Alderson | ................ | H01H 13/86 174/66 |
| 8,721,124 B2 * | 5/2014 | Byrne | ................ | F21V 21/22 362/285 |
| 2003/0186582 A1 * | 10/2003 | Laukhuf | ................ | H01R 25/006 439/535 |
| 2006/0258195 A1 * | 11/2006 | Schwartz | ................ | A47B 21/06 439/131 |
| 2012/0175233 A1 * | 7/2012 | Yu | ................ | H01H 9/18 200/345 |
| 2012/0200989 A1 * | 8/2012 | Byrne | ................ | H01R 13/447 361/641 |
| 2012/0289081 A1 * | 11/2012 | Izzard | ................ | H01R 25/003 439/535 |
| 2014/0116744 A1 * | 5/2014 | Smeja | ................ | H02G 3/08 174/50 |
| 2016/0050375 A1 * | 2/2016 | Soffer | ................ | H04N 5/268 348/445 |
| 2016/0268825 A1 * | 9/2016 | Byrne | ................ | H02J 7/0044 |

\* cited by examiner

US 10,367,317 B1

PORTABLE ELECTRIC POWER HUB WITH AC POWER RECEPTACLES AND USB CHARGING PORTS

CROSS REFERENCE TO OTHER PATENT APPLICATIONS

This application claims the benefit of U.S. application No. 62/518,541, filed Jun. 12, 2017.

STATEMENT OF GOVERNMENT INTEREST

Not Applicable.

FIELD OF THE INVENTION

The present invention relates to a portable electric power hub for use on work surfaces such as conference tables, desks, workstations and work benches.

BACKGROUND

Portable electric power hubs are described in U.S. Pat. Nos. 9,088,088, 9,176,531, 9,219,341, 9,543,770, 9,618,971 and US D739355.

SUMMARY OF THE INVENTION

The present invention sets forth a unique and novel portable electric power hub that comprises a housing that includes a base section having a perimeter that is defined by a plurality of straight edges that are joined by a first plurality of rounded corners. The portable electric power hub further includes an intermediate section that includes a plurality of sides that are joined together by a second plurality of rounded corners. Each side of the intermediate section is adjacent to and aligned with a corresponding one of the plurality of straight edges of the base section and each of the second plurality of rounded corners is adjacent to and aligned with a corresponding one of the first plurality of rounded corners. The portable electric power hub further includes an upper section including a plurality of angulated sides joined by a third plurality of rounded corners. Each angulated side is adjacent to and angulated with respect to a corresponding one of the plurality of sides of the intermediate section and each of the third plurality or rounded corners is adjacent to and aligned with a corresponding one of the second plurality of rounded corners. The portable electric power hub further includes at least one electric power receptacle positioned on the housing.

In an exemplary embodiment of the invention, the base section has six straight edges and six rounded corners.

Certain features and advantages of the present invention have been generally described in this summary section. However, additional features, advantages and embodiments are presented herein or will be apparent to one of ordinary skill of the art in view of the drawings, specification and claims hereof. Accordingly, it should be understood that the scope of the invention shall not be limited by the particular embodiments disclosed in this summary section.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF EXEMPLARY EMBODIMENTS

Figure 1:
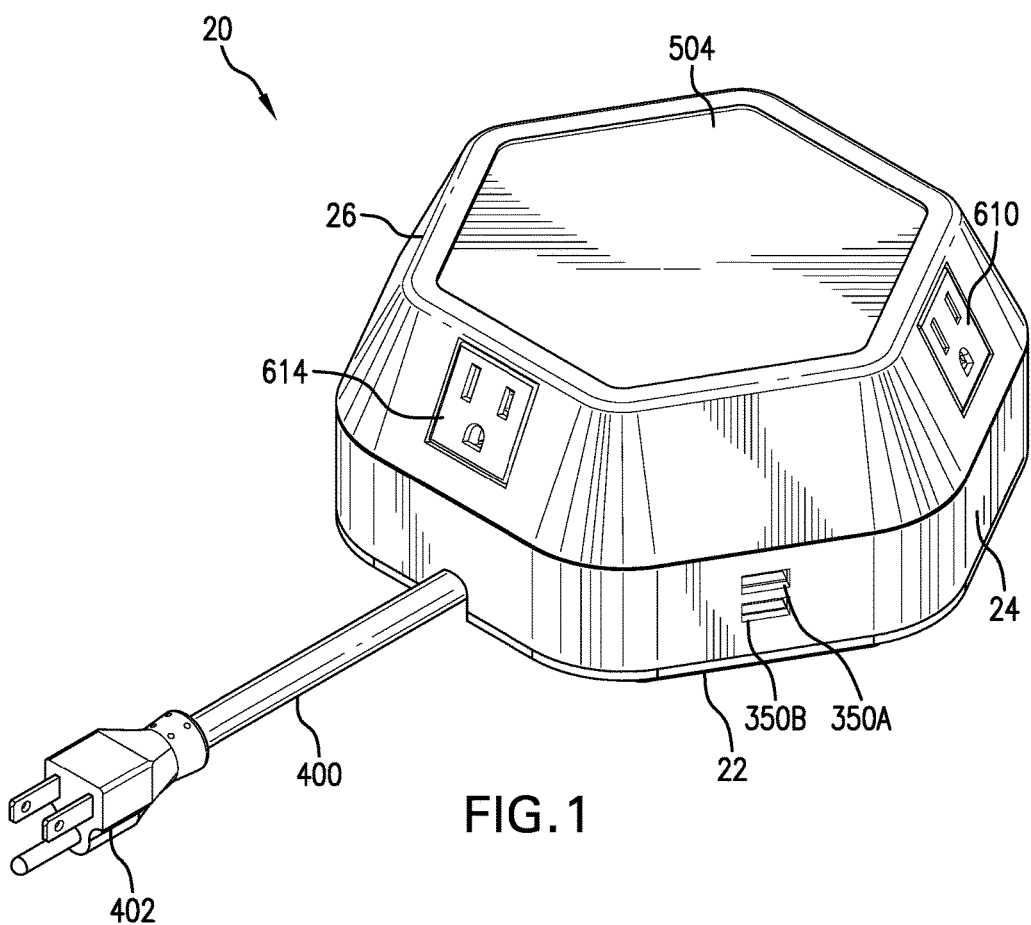
FIG. 1 is a perspective view of the portable electric power hub in accordance with an exemplary embodiment of the present invention.

As used herein, "electric power receptacle" shall include any receptacle that provides an AC (alternating current) or DC (direct current) voltage and includes AC electric power receptacles that provide 110-115 VAC, DC voltage receptacles or ports and USB female sockets that are that used to charge communication devices such as smart phones, tablets, PDAs, etc. The USB female sockets include Twin USB Type-A Female Sockets.

As used herein, "work surface" shall include the top surface of an article of furniture such as a desktop, tabletop, work bench, work station or conference table.

Referring to FIGS. 1-5, there is shown portable electric power hub 20 in accordance with an exemplary embodiment of the present invention. Electric power hub 20 includes base section 22, intermediate section 24 and upper section 26. In an exemplary embodiment, base section 22 has a perimeter defined by six straight edges 30, 32, 34, 36, 38 and 40 joined by rounded corners 42, 44, 46, 48, 50 and 52. Base section 22 includes top side 60 and bottom side 62. Base section 22 includes a plurality of vertically upstanding hollow posts 64 that are attached to top side 60. In one embodiment, vertically upstanding hollow posts 64 are integrally formed as part of base section 22. Each vertically upstanding post 64 has an interior region and an opening 66 that leads to the interior region. Base section 22 includes a plurality of through-holes, each of which being aligned with a corresponding vertically oriented post 64. Each through-hole leads to the interior region of the corresponding vertically oriented post 64 and is sized for receiving a corresponding screw 70 (see FIG. 4). Each screw 70 has a predetermined length such that it extends from opening 66.

Figure 4:
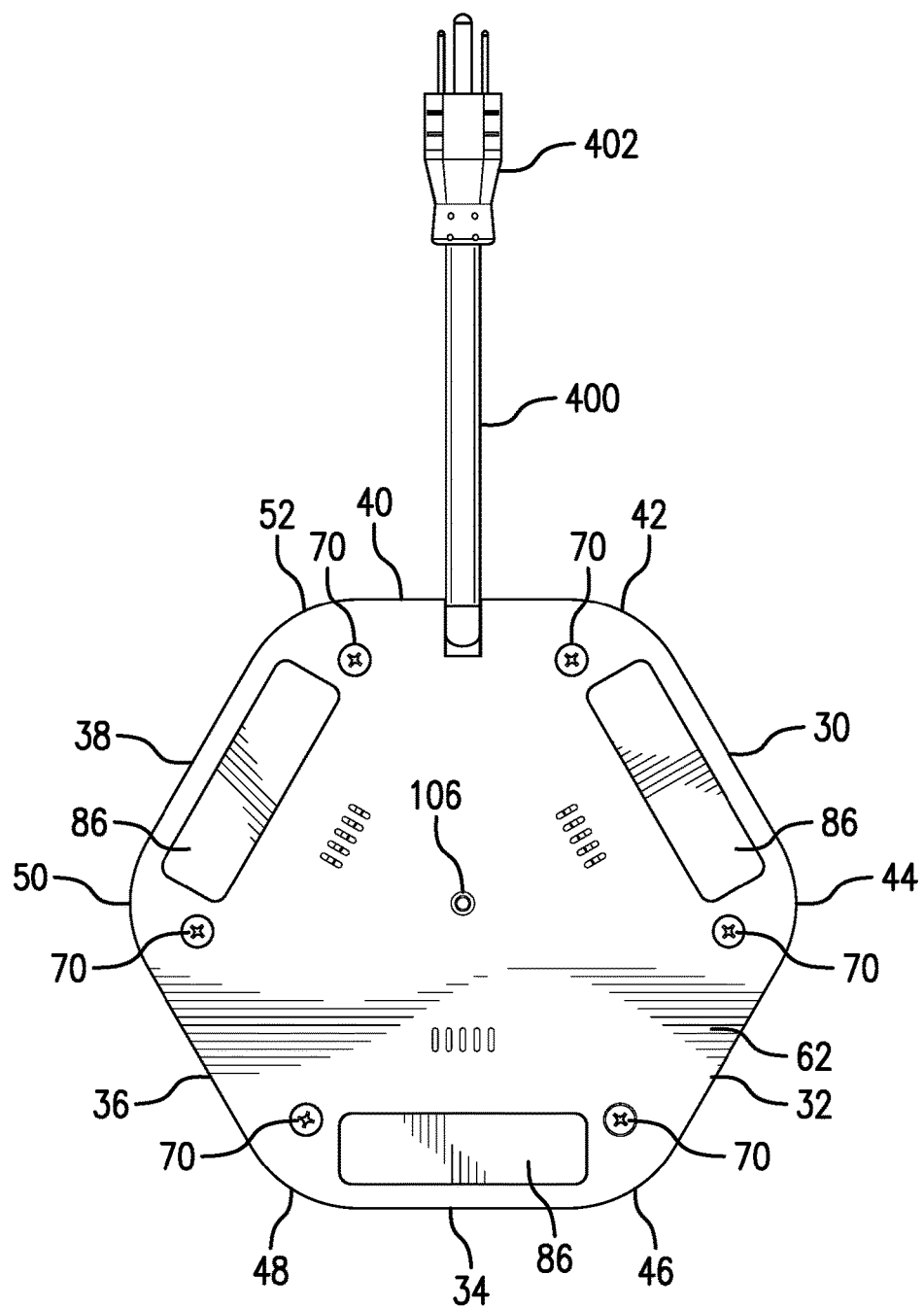
FIG. 4 is a bottom view of the portable electric power hub.
Figure 5:
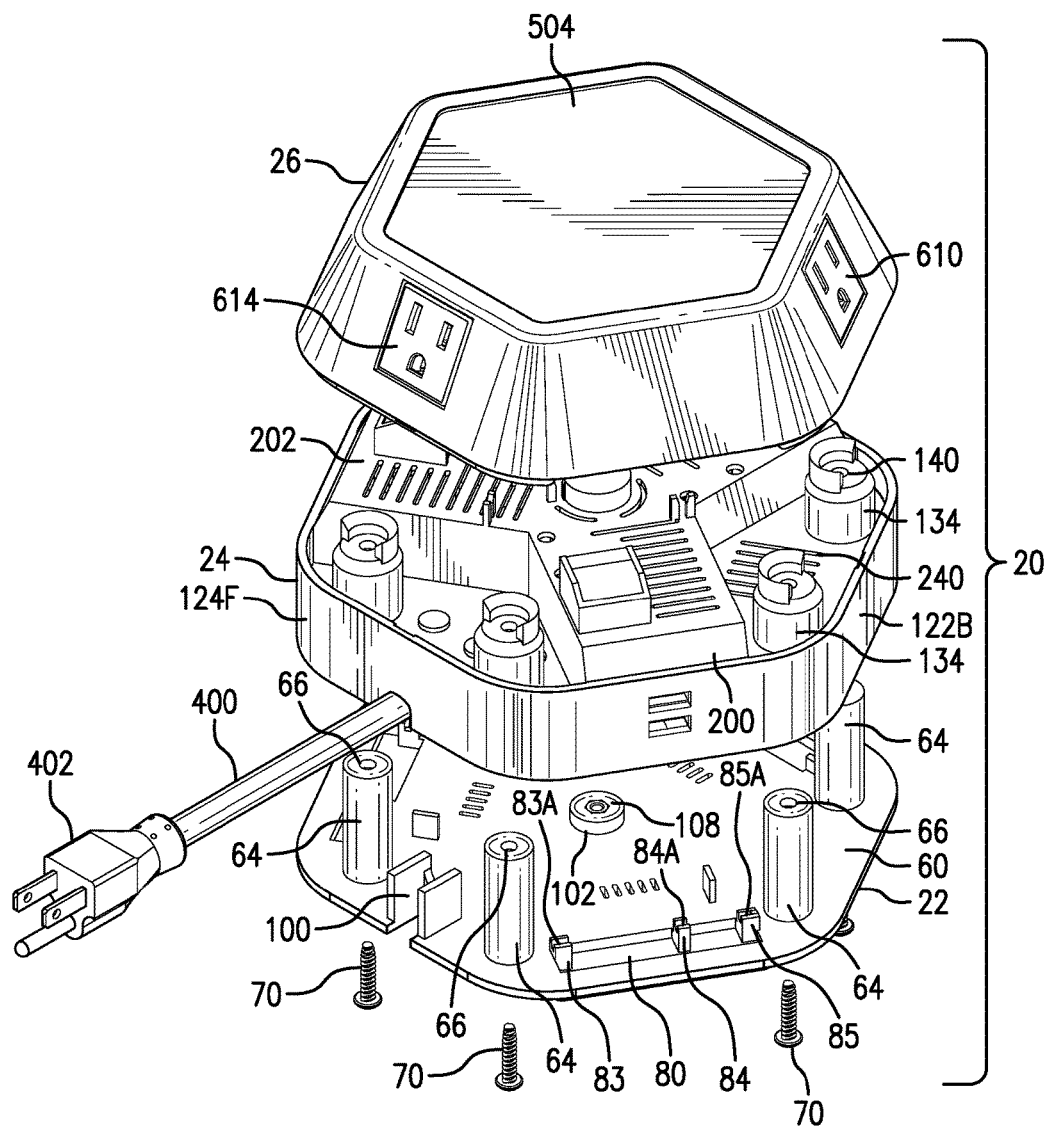
FIG. 5 is an exploded view of the portable electric power hub.

Referring to FIGS. 4 and 5, base section 22 further includes recessed area 80. In an exemplary embodiment, each recessed areas 80 has a substantially rectangular shape. The formation of each recessed area 80 in base section 22 results in corresponding protruding portions 81 on bottom side 62. In an exemplary embodiment, each protruding portion 81 includes an exterior flat surface. Base section 22 includes bosses 83, 84 and 85 that are integral with base section 22. In an exemplary embodiment, base section 22 is molded plastic and bosses 83, 84 and 85 are formed during the molding process that forms base section 22. Boss 83 includes notch 83A. Boss 84 includes notch 84A. Similarly, boss 85 includes notch 85A. Bosses 83, 84 and 85 are not utilized in the embodiment shown in FIG. 5. However, the purpose and function of bosses 83, 84 and 85 is described in the ensuing description with respect to the embodiment shown in FIG. 10. Referring back to FIGS. 2 and 4, a relatively pliable material 86 is attached to the exterior flat surface of each protruding portion 81. Suitable pliable material 86 may be fabricated from materials such as rubber, resin, etc. The pliable material 86 contacts a work surface without causing any damage or surface abrasions to the work surface. In an exemplary embodiment, pliable material 86 is removably attached to the exterior flat surface of each protruding portion 81.

Referring to FIGS. 4 and 5, base section 22 includes electrical cable harness 100 which is sized to fit around a portion of electrical cable 400. Base section 22 further includes raised portion 102 that defines through-hole 106 which extends through the thickness of base section 22 and raised portion 102. Threaded nut 108 is firmly positioned within through-hole 106. This configuration provides a user with the option of attaching portable electric power hub 20 to a work surface. In order to take advantage of this option, the user must first drill a hole through the work surface. The user then inserts a threaded screw through the drilled hole from the bottom of the work surface. The user then must align portable electric power hub 20 with the drilled hole so the threaded screw enters through-hole 106 and becomes threadedly engaged with threaded nut 108. The user rotates the threaded screw until portable electric power hub 20 is firmly positioned on the work surface.

Referring to FIGS. 1, 5, 8 and 9A and 9B, intermediate section 24 includes exterior surface 120 that comprises a plurality of straight sides 122A-F and a plurality of rounded corners 124A-F. In an exemplary embodiment, each side 122A-F is substantially vertically oriented. Intermediate section 24 includes top side 130 and bottom side 132. Intermediate section 24 includes a plurality of upstanding hollow posts 134 that are on top side 130. In one embodiment, posts 134 are attached to top side 130. In another embodiment, posts 134 are integrally formed with intermediate section 24. Each post 134 has top opening 140 that leads to the hollow interior of post 134 and bottom opening 142 that allows entry into the hollow interior region. Each bottom opening 142 is sized to receive a corresponding vertically upstanding post 64 of base section 22. Thus, when intermediate section 24 is mounted to base section 22, each vertically upstanding post 64 is inserted through bottom opening 142 of a corresponding upstanding post 134 and into the hollow interior region of that upstanding post 134. Each upstanding post 134 includes an alignment structure 144 which facilitates aligning each post 134 with a corresponding threaded screw-receiving member 150 that is attached to the interior side 160 of upper section 26 (see FIG. 6B). The purpose of screw receiving members 150 is discussed in the ensuing description. In an exemplary embodiment, each alignment structure 144 is generally semi-circular in shape. This particular shape facilitates placement and alignment of a corresponding screw receiving member 150 so as to allow screws 70 to be inserted through upstanding post members 64 and 134 and into threaded screw inlets of screw-receiving members 150 in order to attach or join base section 22, intermediate section 24 and upper section 26 together.

Figure 8:
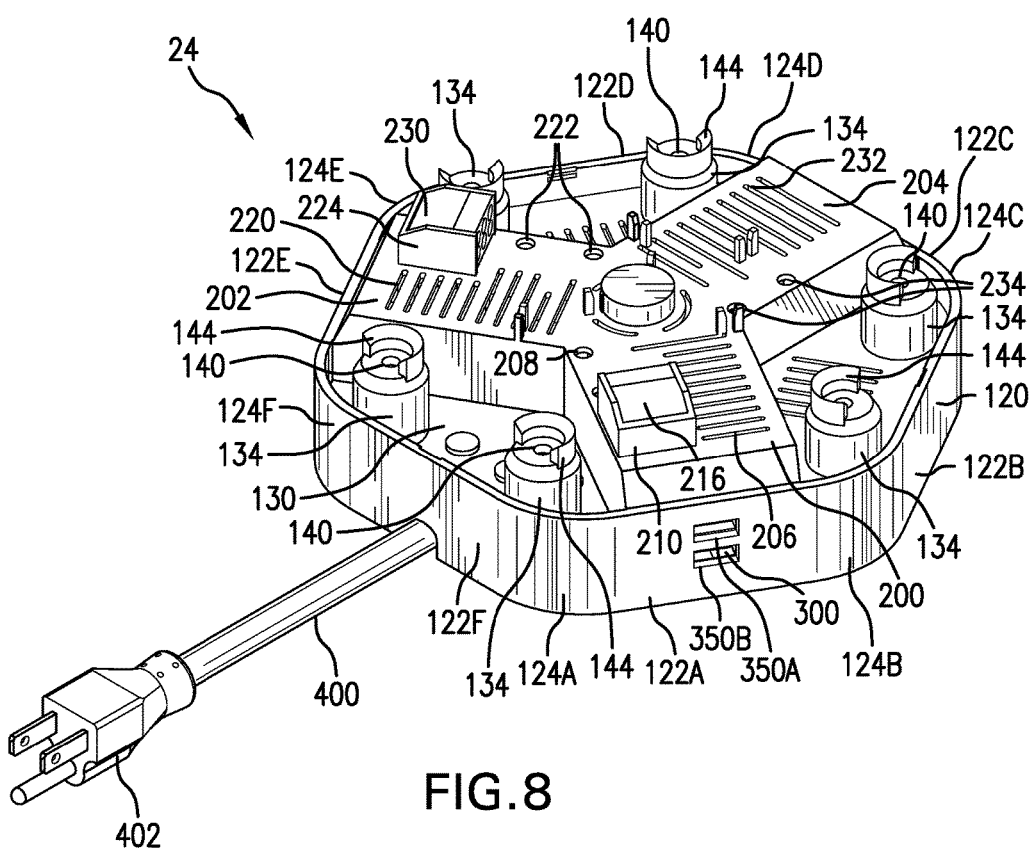
FIG. 8 is a perspective view of an intermediate section of the housing, the view showing the intermediate section right side up.

Referring to FIGS. 5, 8, 9A and 9B, intermediate section 24 further includes electrical circuit board covers structures 200, 202 and 204. In an exemplary embodiment, as shown in FIG. 8, electrical circuit board cover structures 200, 202 and 204 extend radially from the center of intermediate section 24. Electrical circuit board cover structure 200 includes air vents 206, wire through-holes 208 and electrical wire terminal retainer 210. Electrical wire terminal 216 is removably secured within electrical wire terminal retainer 210. Similarly, electrical circuit board cover structure 202 includes air vents 220, wire through-holes 222 and electrical wire terminal retainer 224. Electrical wire terminal 230 is removably secured within electrical wire terminal retainer 224. Electrical circuit board cover structure 204 includes air vents 232 and wire through-holes 234. In this embodiment, electrical circuit board cover structure 204 does not have a corresponding electrical wire terminal retainer as does electrical circuit cover structures 200 and 202. Intermediate section 24 further includes air vents 240, the purpose of which is described in the ensuing description.

Figure 9A:
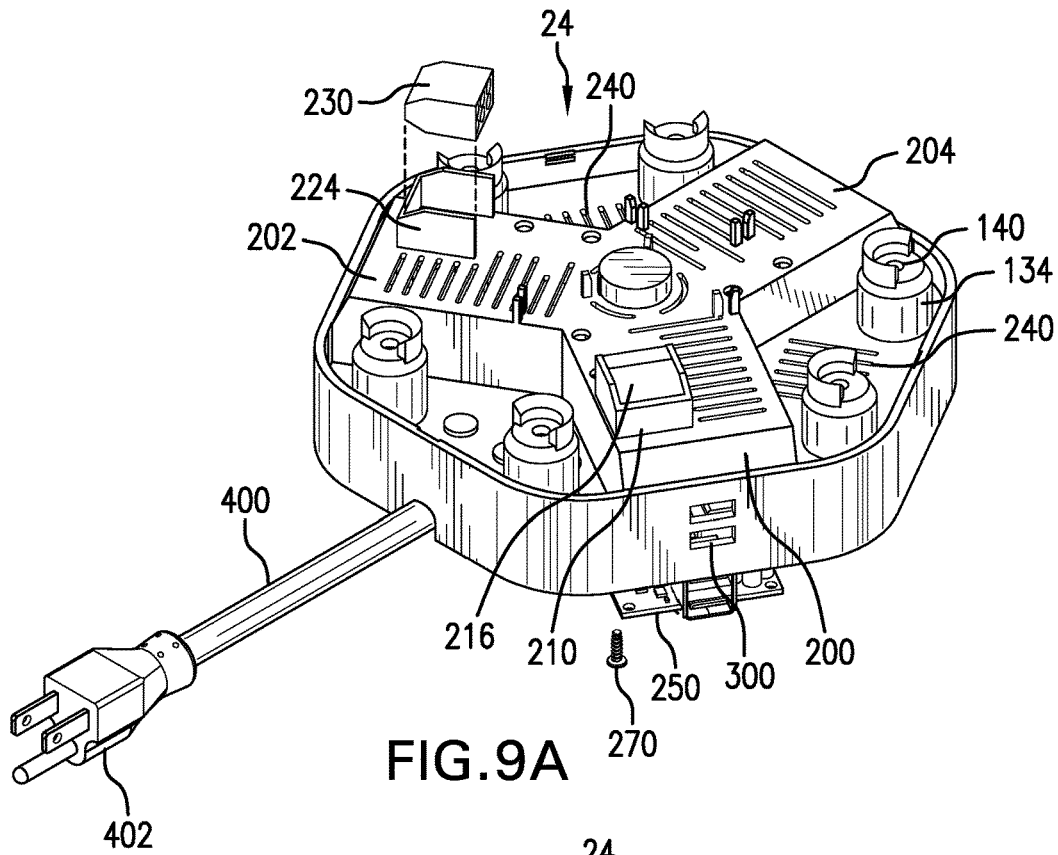
FIG. 9A is another perspective view of the intermediate section of the housing, the view showing the intermediate section right side up.
Figure 9B:
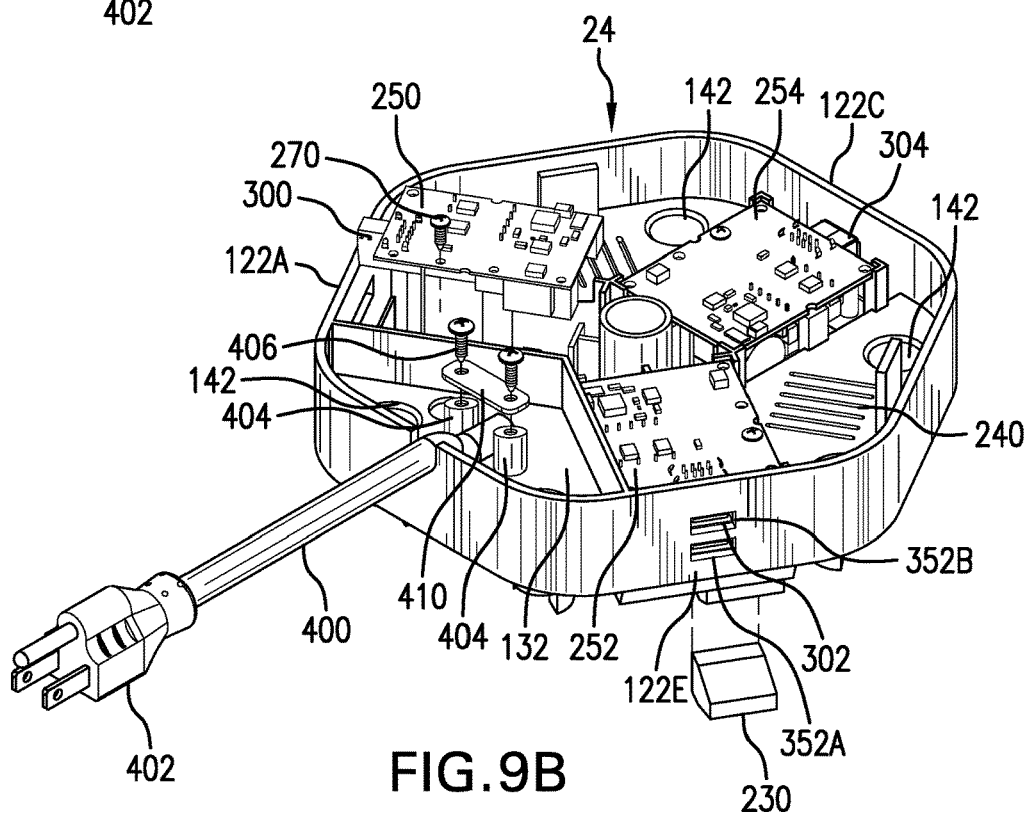
FIG. 9B is another perspective view of the intermediate section of the housing, the view showing the intermediate section upside down so as to facilitate viewing of electronic circuit boards having USB female sockets connected thereto.

Referring to FIG. 9B, there is shown intermediate section 24 in upside down position. Intermediate section 24 further includes electrical circuit boards 250, 252 and 254. Electrical circuit board 250 is attached to bottom side 132 and positioned under electrical circuit board cover structure 200. Electrical wires (not shown) are electrically connected to electrical circuit board 250 and pass through wire through-holes 208. Electrical circuit board 252 is attached to bottom side 132 and positioned under electrical circuit board cover structure 202. Electrical wires (not shown) are electrically connected to electrical circuit board 252 and pass through wire through-holes 222. Similarly, electrical circuit board 254 is attached to bottom side 132 and positioned under electrical circuit board cover structure 204. Electrical wires (not shown) are electrically connected to electrical board 254 and pass through wire through-holes 234. In an exemplary embodiment, electrical circuit boards 250, 252 and 254 are screwed via screws 270 to threaded inlets in upstanding posts or standoffs (not shown) that are attached to or integral with bottom side 132 of intermediate section 24. However, it is to be understood that other techniques maybe used to attach electrical circuit boards 250, 252 and 254 to bottom side 132. Heat generated by electrical circuit boards 250, 252 and 254 passes through air vents 206, 220 and 232, respectively. This heat also passes through air vents 240 (see FIG. 5).

Referring to FIGS. 5, 8 and 9B, each electrical circuit board 250, 252 and 254 includes an electric power receptacle 300, 302 and 304, respectively. In an exemplary embodiment, each electric power receptacle comprises dual USB female sockets. In such an embodiment, each electrical circuit board 250, 252 and 254 comprises electrical circuitry that converts 110-120 VAC to a DC voltage suitable for charging wireless communication devices such as smart phones, tablets, PDAs, etc. This DC voltage is available at each of the dual USB female sockets. In one embodiment, the dual USB female sockets are configured as dual USB Type-A Female Sockets. As shown in FIGS. 8, 9A and 9B, each USB female socket is accessible through a corresponding opening in one of the sides of the intermediate section 24. For example, as shown in FIG. 8, side 122A has openings 350A and 350B that allow access to the USB female sockets of electric power receptacle 300 of electrical circuit board 250. Similarly, in FIG. 9B, side 122E has openings 352A and 352B that allow access to the USB female sockets of electrical power receptacle 302 of electrical circuit board 252. Electrical circuit board 254 also includes electrical power receptacle 304 which has dual USB female sockets that are aligned with corresponding openings (not shown) in side 122C of intermediate section 24.

Referring to FIGS. 9A and 9B, intermediate section 24 includes electrical cable 400 which contains "hot", "neutral" and electrical ground wires as is known in the art. Electrical cable 400 includes male plug 402 which is adapted to be electrically connected to a source of AC electric power. Intermediate section 24 further includes upstanding posts 404 that are attached to or integrally formed with bottom side 132. Each post 404 has threaded inlets for receiving screws 406. Clamp member 410 has through-holes for receiving screws 406. When screws 406 are inserted through the through-holes of clamp member 410 and threadedly engage the threaded inlets of posts 404, clamp member 410 presses against electrical cable 400 so as to provide strain relief.

Figure 2:
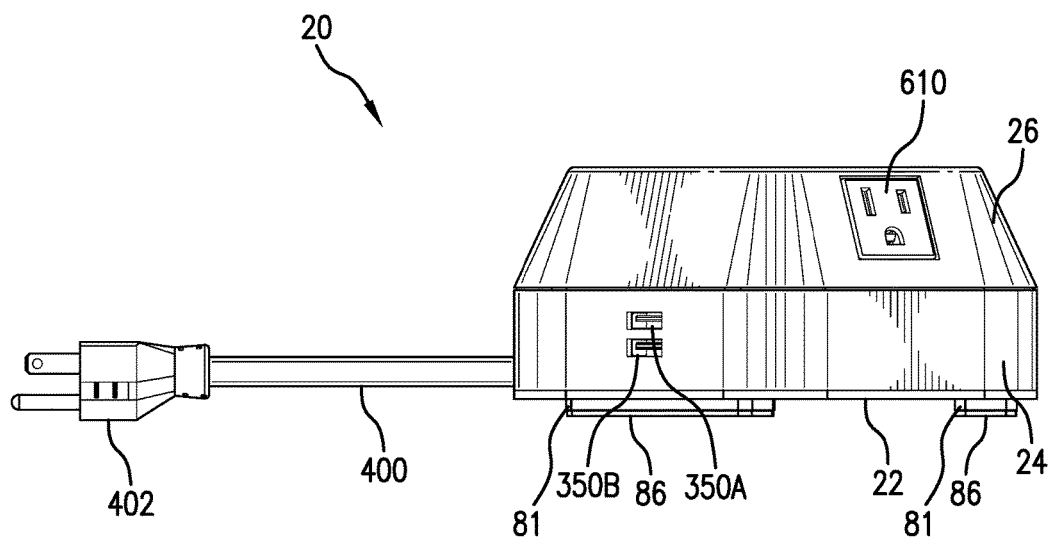
FIG. 2 is a side view of the portable electric power hub.
Figure 3:
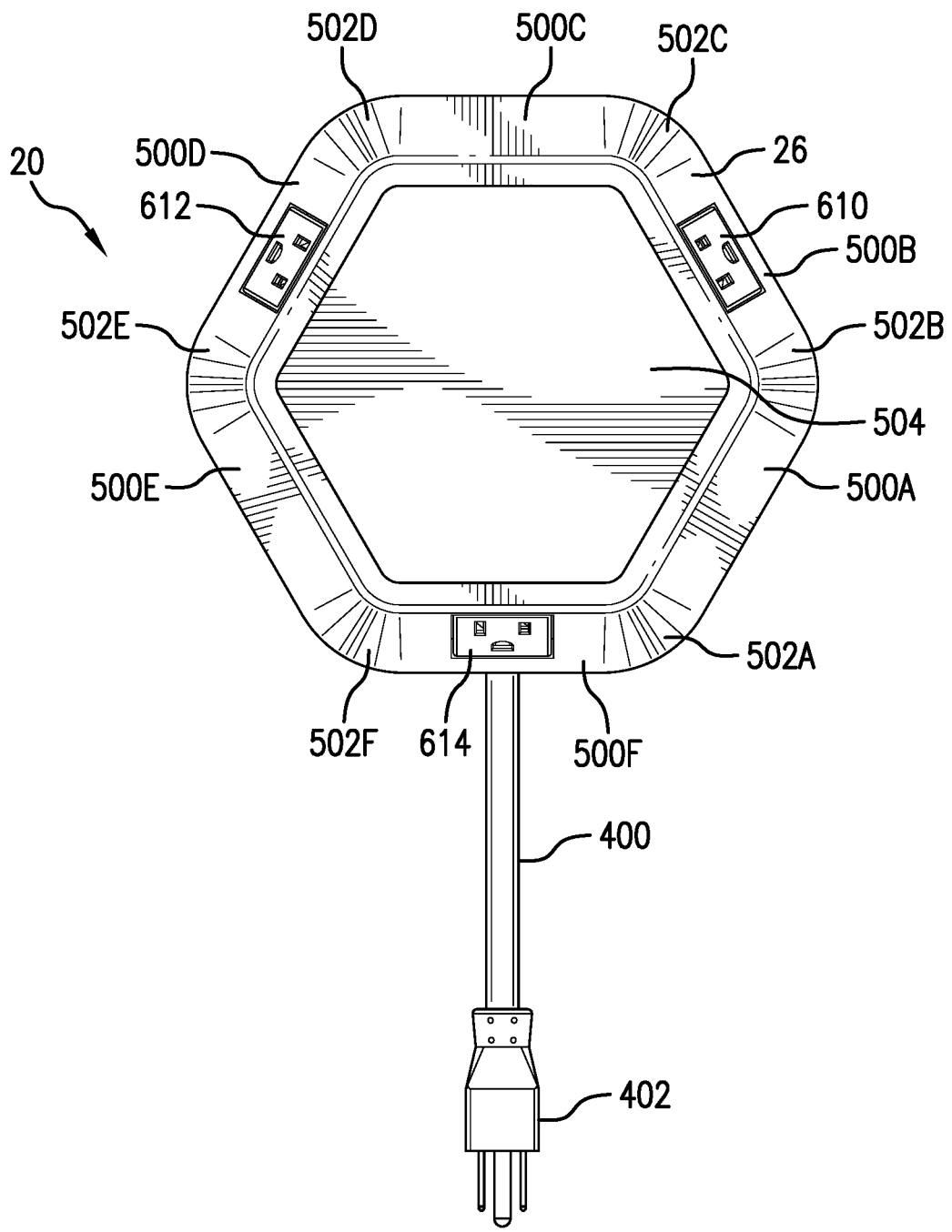
FIG. 3 is a top view of the portable electric power hub.

Referring to FIGS. 1, 5, 6A, 6B and 7, upper section 26 includes a plurality of straight sides 500A-F and round curves 502A-F, top exterior side 504 and interior side 505. Straight sides 500A-F are aligned with and adjacent to straight sides 122A-F, respectively, of intermediate section 24. Each rounded corner 502A-F is aligned with and adjacent to a corresponding rounded corner 124A-F, respectively, of intermediate section 24. In an exemplary embodiment, straight sides 500A-F are angulated inward with respect to straight sides 122A-F, respectively, as shown in FIGS. 1-3. In one exemplary embodiment, the degree of angulation of each straight side 500A-F is about 30 degrees. In another exemplary embodiment, the degree of angulation of each straight side 500A-F is 45 degrees. However, it is to be understood that other degrees of angulation are possible. Screw receiving members 150 are attached to and upwardly extend from interior side 505. In another embodiment, screw receiving members 150 are integrally formed with interior side 505.

Upper section 26 includes electrical connector retainers 550, 552 and 554 which all have the same structure. Electrical connector retainer 550 includes side walls 560 and 562. The space between side walls 560 and 562 is sized to allow an electrical connector 570 to be frictionally positioned between sidewalls 560 and 562. Such a configuration allows electrical connector 570 to be removed from electrical connector retainer 550. Similarly, electrical connector 572 is frictionally positioned within electrical connector retainer 552. Similarly, electrical connector 574 is frictionally positioned within electrical connector retainer 554.

Figure 6A:
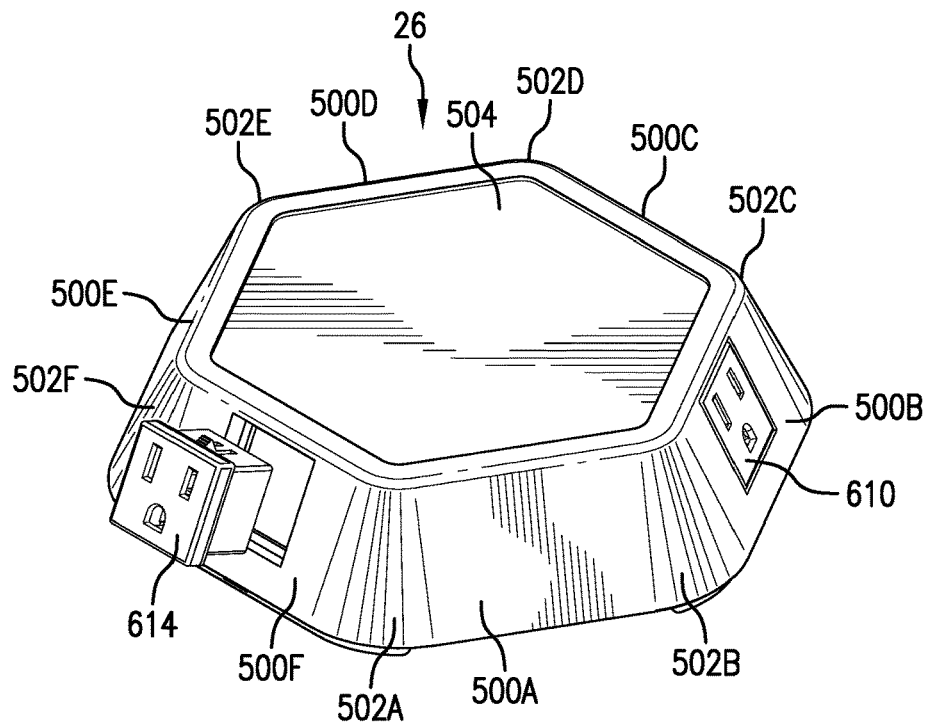
FIG. 6A is a perspective view of an upper section of the housing of the portable electric power hub, the view showing the exterior surface of the upper section.
Figure 6B:
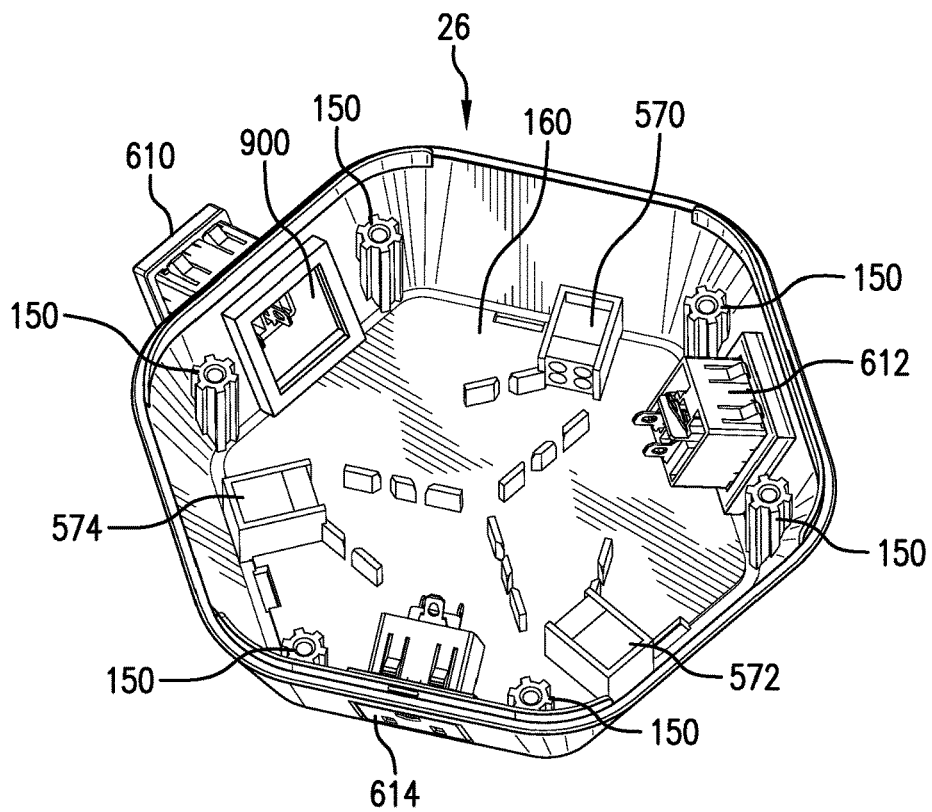
FIG. 6B is a perspective view of the interior of the upper section of the housing.
Figure 7:
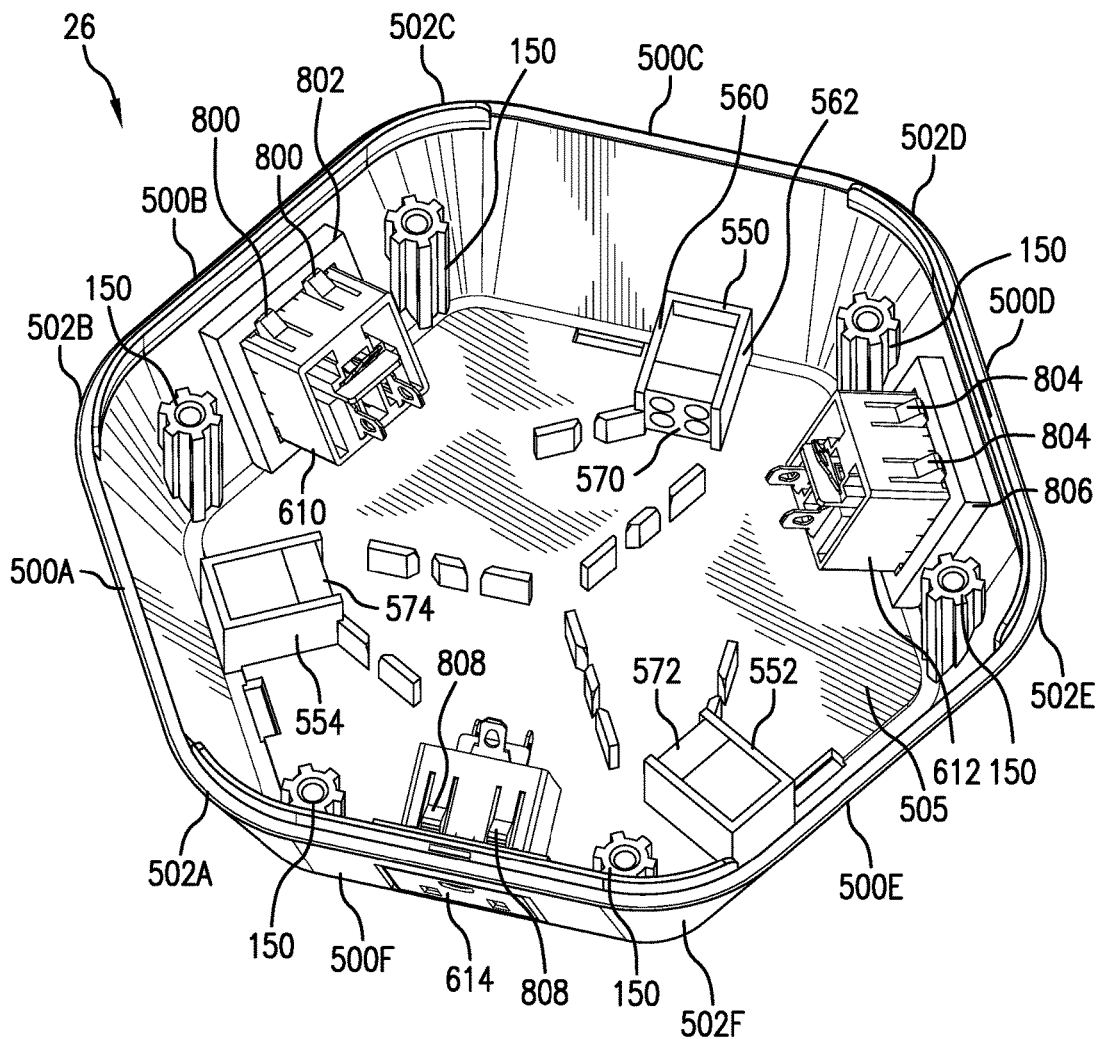
FIG. 7 is an enlarged perspective view of the interior of the upper section of the housing.

Upper section 26 includes AC electric power receptacles 610, 612 and 614. In an exemplary embodiment, AC electric power receptacles 610, 612 and 614 are mounted to alternate sides of upper section 26. For example, AC electric power receptacle 610 is mounted or attached to side 500B, AC electric power receptacle 612 is mounted to or attached to side 500D and AC electric power receptacle 614 is mounted or attached to side 500F. In an exemplary embodiment, each AC electric power receptacle 610, 612 and 614 includes resilient tabs that allow each AC electric power receptacle 610, 612 and 614 to be snapped into place within a corresponding opening in one of the sides of upper section 26. For example, as shown in FIGS. 6B and 7, AC electric power receptacle 610 includes resilient tabs 800 and an additional resilient tab (not shown) that is on the other side of AC electric power receptacle 610 which allow AC electric power receptacle 610 to be snapped into place within opening 900 in side 500B. Specifically, once AC electrical power receptacle 610 is snapped in place, resilient tabs 800 abut frame 802. In an exemplary embodiment, frame 802 is integral with upper section 26. In another embodiment, frame 802 is attached to the interior surface of upper section 26. Similarly, AC electric power receptacle 612 includes resilient tabs 804 and an additional tab (not shown) that is on the other side of AC electric power receptacle 612 which allow AC electric power receptacle 612 to be snapped into place within a corresponding opening in side 500D of upper section 26. Once AC electric power receptacle 612 is snapped into place, resilient tabs 804 abut frame 806 which may be integrally formed with upper section 26 or attached to the interior surface of upper section 26. Similarly, AC electric power receptacle 614 includes resilient tabs 808 and a third resilient tab (not shown) on the other side of AC electric power receptacle 614 that allow AC electric power receptacle 614 to be snapped into place within a corresponding opening in side 500F of upper section 26. Once AC electric power receptacle 614 is snapped into place, resilient tabs 808 abut the corresponding frame (not shown but similar to frames 802 and 806). The aforementioned resilient tabs on the AC electric power receptacles allow the AC electric power receptacles to be removably attached or mounted to upper section 26. Other techniques may be used to removably attach or mount the AC electric power receptacles to upper portion 26. In another embodiment, the AC electrical power receptacles are rigidly attached to upper section 26.

The "hot", "neutral" and electrical ground wires contained within electrical cable 400, and additional wires (not shown) internal to portable electric power hub 20 and electrical wire connectors 216, 230, 570, 572 and 574 form a wiring network that provides 110-120 VAC to AC electric power receptacles 610, 612 and 614, and electrical circuits 250, 252 and 254.

Figure 10:
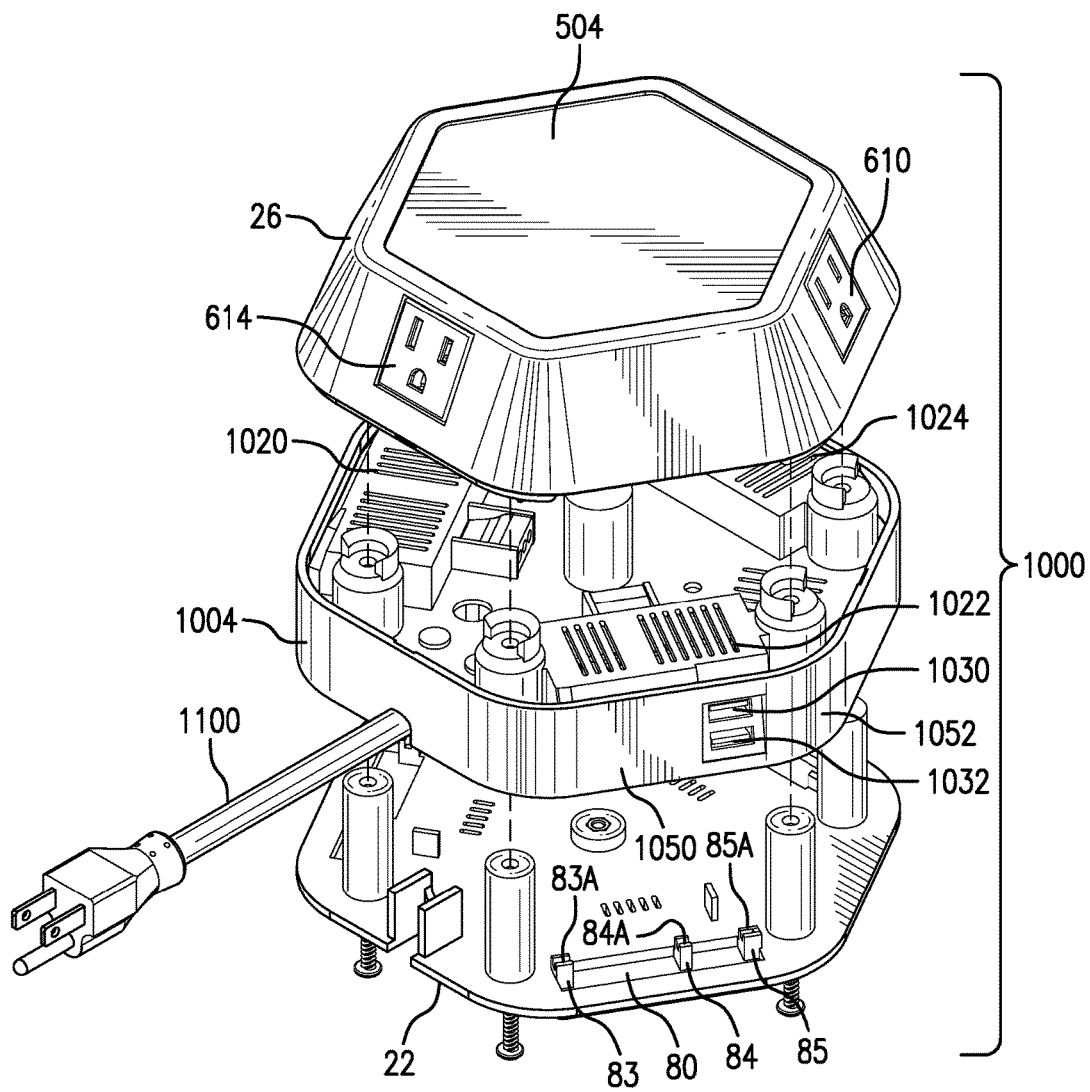
FIG. 10 is an exploded view of a portable electric power hub in accordance with another embodiment of the present invention.
Figure 11:
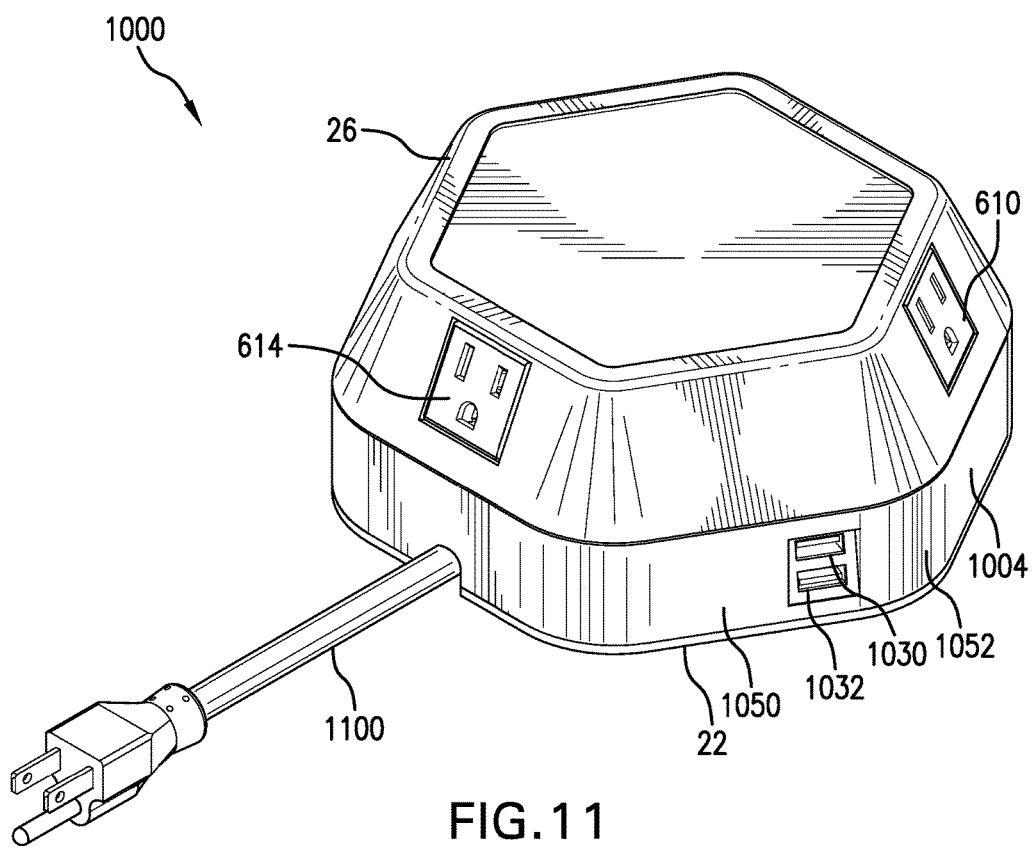
FIG. 11 is a perspective view of the portable electric power hub of FIG. 10.

Referring to FIG. 10, there is shown portable electric power hub 1000 in accordance with another embodiment of the present invention. Portable electric power hub 1000 comprises a housing which comprises base section 22, intermediate section 1004 and upper section 26. Base section 22 has already been described herein and is therefore not described in detail. Upper section 26 includes AC power receptacles 610, 612 and 614. Upper section 26 has already been described herein and is therefore not described in detail. Section 1004 includes electrical circuit board covers 1020, 1022 and 1024 which are similar to electric circuit board covers 200, 202 and 204 shown in FIG. 8 except electrical circuit board covers 1020, 1022 and 1024, and the corresponding electrical circuit boards (not shown), are arranged laterally with respect to the center point of intermediate section 1004. Such a configuration shifts the position of the dual USB female sockets. Specifically, the dual USB female sockets are now located at one end of the straight side adjacent to a rounded corner. For example, as shown in FIGS. 10 and 11, dual USB female sockets 1030 and 1032 are positioned at one end of straight side 1050 near rounded corner 1052. Electrical cable 1100 has the same configuration and function as cable 400. Bosses 83, 84 and 85 of each recessed area 80 support the electrical circuit boards (not shown) that are housed within laterally oriented circuit board covers 1020, 1022 and 1024. Specifically, notches 83A, 84A and 85A of bosses 83, 84 and 85, respectively, receive corresponding portions of the electrical circuit board (not shown) thereby providing support to the electrical circuit board.

Any one of a variety of suitable materials may be used to fabricate portable electric power hubs 20 and 1000, e.g. plastic, resin, rubber, PVC, metal, composite materials, etc.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications so as to thereby enable others skilled in the art to best utilize the invention and various embodiments with various modifications as are suited to the particular use contemplated.

What is claimed is:

1. A portable electric power hub for placement on a work surface, comprising:
    a housing including:
        a base section having a perimeter that is defined by a plurality of straight edges joined by a first plurality of rounded corners,
        an intermediate section including a plurality of vertically oriented sides that are joined together by a second plurality of rounded corners, wherein each side of the intermediate section is adjacent to and aligned with a corresponding one of the plurality of straight edges of the base section and wherein each of the second plurality of rounded corners is adjacent to and aligned with a corresponding one of the first plurality of rounded corners, wherein the vertically oriented sides are perpendicular to a work surface when the portable electric power hub is placed on such work surface and wherein each vertically oriented side has a surface area that is sufficiently sized for attaching thereto an electric power receptacle;
        an upper section including a plurality of angulated sides joined by a third plurality of rounded corners, wherein each angulated side is adjacent to and angulated inward with respect to a corresponding one of the plurality of sides of the intermediate section and wherein each of the third plurality of rounded corners is adjacent and aligned with a corresponding one of the second plurality of rounded corners;
    a plurality of AC electric power receptacles, wherein one AC electric power receptacle is positioned on every other angulated side of the upper section;
    a plurality of USB female sockets, wherein one USB female socket is positioned on every other vertically oriented side;
    a plurality of electrical circuits, wherein each circuit is electrically connected to a corresponding USB female socket and configured to convert AC electric power to DC electric power and provide the DC electric power to the USB female socket;
    an electrical power cable for providing electrical power to the AC electric power receptacles and electrical circuits and being adapted to be connected to a source of electrical power; and
    means for removably attaching the portable electrical power hub to the work surface.

2. The portable electric power hub according to claim 1 wherein each AC electric power receptacle is removably attached to the angulated side.

3. The portable electric power hub according to claim 1 wherein the perimeter of said base section is defined by six straight edges joined by said first plurality of rounded corners.

4. The portable electric power hub according to claim 1 further comprising means for interconnecting the base section, intermediate section and upper section.

5. A portable electric power hub for placement on a work surface, comprising:
    a housing including:
        a base section having a perimeter that is defined by a plurality of straight edges joined by a first plurality of rounded corners,
        an intermediate section including a plurality of vertically oriented sides that are joined together by a second plurality of rounded corners, wherein each side of the intermediate section is adjacent to and aligned with a corresponding one of the plurality of straight edges of the base section and wherein each of the second plurality of rounded corners is adjacent to and aligned with a corresponding one of the first plurality of rounded corners, wherein the vertically oriented sides are perpendicular to a work surface when the portable electric power hub is placed on such work surface and wherein each vertically oriented side has a surface area that is sufficiently sized for attaching thereto an electric power receptacle;
        an upper section including a plurality of angulated sides joined by a third plurality of rounded corners, wherein each angulated side is adjacent to and angulated inward with respect to a corresponding one of the plurality of sides of the intermediate section and wherein each of the third plurality of rounded corners is adjacent and aligned with a corresponding one of the second plurality of rounded corners;
    a plurality of AC electric power receptacles, wherein one AC electric power receptacle is positioned on every other angulated side of the upper section;
    a plurality of USB female sockets, wherein one USB female socket is positioned on every other vertically oriented side;
    a plurality of electrical circuits, wherein each circuit is electrically connected to a corresponding USB female socket and configured to convert AC electric power to DC electric power and provide the DC electric power to the USB female socket;
    an electrical power cable for providing electrical power to the AC electric power receptacles and electrical circuits and being adapted to be connected to a source of electrical power; and
    means for interconnecting the base section, intermediate section and upper section.

* * * * *